United States Patent
Metelski

(10) Patent No.: US 7,839,584 B2
(45) Date of Patent: Nov. 23, 2010

(54) DEVICE FOR VIBRATION-FREE MOUNTING OF A SPINDLE IN A STAND OF A SURGICAL MICROSCOPE

(75) Inventor: Andrzej Metelski, Romanshorn (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 431 days.

(21) Appl. No.: 11/847,622

(22) Filed: Aug. 30, 2007

(65) Prior Publication Data

US 2008/0058109 A1 Mar. 6, 2008

(30) Foreign Application Priority Data

Aug. 31, 2006 (DE) ........................ 10 2006 040 868
Sep. 21, 2006 (DE) ........................ 10 2006 044 469

(51) Int. Cl.
*G02B 7/02* (2006.01)
(52) U.S. Cl. ........................ 359/823; 269/71
(58) Field of Classification Search ............... 464/91; 74/27, 28; 269/71–73; 359/811, 819, 823
See application file for complete search history.

(56) References Cited

U.S. PATENT DOCUMENTS

| 1,775,556 | A | * | 9/1930 | Hewel ........................ 464/91 |
| 3,323,326 | A | * | 6/1967 | Vertson .................... 464/91 X |
| 3,638,933 | A | * | 2/1972 | Burnette et al. |
| 5,667,186 | A | | 9/1997 | Luber et al. |
| 6,190,997 | B1 | * | 2/2001 | Becker et al. ............. 269/71 X |
| 6,532,108 | B1 | * | 3/2003 | Pensel |
| 7,595,941 | B2 | * | 9/2009 | Metelski ..................... 359/819 |
| 2006/0250685 | A1 | | 11/2006 | Metelski |

OTHER PUBLICATIONS

Getzner Werkstoffe, "Effective insulation of machine-generated vibrations—SYLOMER", Austria, Apr. 2002.
Getzner Werkstoffe, "Overview of materials", Austria, Aug. 2004.

* cited by examiner

*Primary Examiner*—Greg Binda
(74) *Attorney, Agent, or Firm*—Hodgson Russ LLP

(57) ABSTRACT

A device for mounting a drive shaft driven by a drive motor is described, in which device a carriage is driven via the drive shaft. The drive motor is embodied as a stepper motor (1), and the drive shaft (6) is joined to the carriage (8; 9) via an elastomeric damper (3).

9 Claims, 4 Drawing Sheets

DEVICE FOR VIBRATION-FREE MOUNTING OF A SPINDLE IN A STAND OF A SURGICAL MICROSCOPE

CROSS REFERENCE TO RELATED APPLICATIONS

This application claims priority of German patent application 10 2006 040 868.3 filed Aug. 31, 2006 and German patent application 10 2006 044 469.8 filed Sep. 21, 2006, both of which are incorporated by reference herein.

FIELD OF THE INVENTION

The invention relates to a device for vibration-free mounting of a drive shaft, such as a threaded spindle, to a carriage. The invention finds particular application in an X-Y displacement unit for mounting a surgical microscope on a stand.

BACKGROUND OF THE INVENTION

The purpose of the stands of a surgical microscope is on the one hand to hold the microscopes securely, and on the other hand to ensure counterbalanced positioning of the surgical microscope. This counterbalancing is usually achieved by way of displaceable counterweights so that, despite changeable loads, the microscope is easily positionable in three dimensions.

DE 43 20 443 A1 discloses a stand for a surgical microscope that uses displaceable weights for weight compensation. Also presented in this document is a motorized X-Y positioning unit that is arranged on the stand and carries the surgical microscope. The motorized X-Y positioning unit comprises two carriages that are embodied movably via a DC motor and a linkage. This X-Y positioning unit is evidently used in this document to carry out an automatic fine balancing of the surgical microscope.

An X-Y positioning unit of this kind can also be used in a counterbalanced microscope or stand to move the surgical microscope over the surgical site in the X and Y directions so as thereby to establish a different image area during the operation.

The existing solution provides, for such displacement by an X-Y positioning unit, DC motors having an encoder and linkage. These solutions have proven to function well, but because of the many components are very complex and of correspondingly large dimensions. The linkages furthermore cause noise, which has been reduced by way of so-called solid-borne sound dampers. An apparatus for securing a solid-borne sound-transferring component is depicted and described in DE 10 2005 014 376 (not previously published).

Previous attempts to replace the DC motors having a separate linkage and encoder with stepper motors of simple construction having an integrated spindle or drive shaft failed because the individual steps of the motors resulted in a jerky motion in the image. Jerky motions in the image are, however, unacceptable to a surgeon. The jerky motion furthermore causes an oscillation of the moving mass and consequently an excitation of the system, in particular of the microscope. The microscope, weighing approximately 15 kg, begins to oscillate slowly, and the result is an unstable image for the surgeon. The microscope continues to oscillate even after the stepper motor is shut off. This has proven to be unusable in practice.

SUMMARY OF THE INVENTION

It is an object of the present invention to enable the use of stepper motors having a drive shaft, and thereby to eliminate the disadvantages referred to above.

This object is achieved by the invention described herein.

The invention is notable for the fact that the drive shaft of the stepper motor is joined to the carriage via at least one elastomeric damper. The result of this is that no direct connection exists between the drive shaft and the carriage, and vibrations and other disruptions are dissipated by the technical spring or elastomeric damper.

The motion of the motor, i.e. at each individual step, causes a jerky motion of the drive shaft and thus also of the carriage. Without the elastomeric damper, these jerky motions are transferred as a pulse to the housing and microscope. With the elastomeric damper, these pulses are received and absorbed by the damper. No pulse transfer to the carriage therefore takes place, and oscillation of the carriage or the microscope is prevented.

An elastomeric damper having the aforementioned properties is marketed, for example, by the company styled Getzner Werkstoffe, Bürs/Bludenz, Austria.

In a further embodiment of the invention, the carriage comprises a flange in which the elastomeric damper is movably arranged, so that possible excursions of the drive shaft or spindle are compensated for by a displacement of the elastomeric damper in the flange.

In a refinement of the invention, the elastomeric damper is embodied as a washer that comprises a centered orifice for the drive shaft. This ensures secure retention of the drive shaft in the elastomeric damper.

In a further embodiment of the invention, multiple elastomeric dampers arranged next to one another are provided in order to enhance the damping properties.

In a further embodiment of the invention, the stepper motor having the drive shaft and the elastomeric bearing is provided as a drive for a zoom system in the surgical microscope, so that no vibrations are transferred to the stand or to the surgical microscope upon a change in magnification by adjustment of the zoom.

In a preferred embodiment of the invention, the stepper motor having the drive shaft and the elastomeric bearing is arranged as a drive in an X-Y displacement unit for the surgical microscope so as thereby to ensure vibration-free movement of the microscope over the surgical site even during the operation.

In a refinement of the invention, the stepper motor is equipped directly with a spindle, in particular a threaded spindle, so that an additional linkage is superfluous.

BRIEF DESCRIPTION OF THE DRAWINGS

The invention is schematically depicted in the drawings and will be described below in an exemplifying embodiment with reference to the Figures, in which.

DETAILED DESCRIPTION OF THE INVENTION

Figure 1:
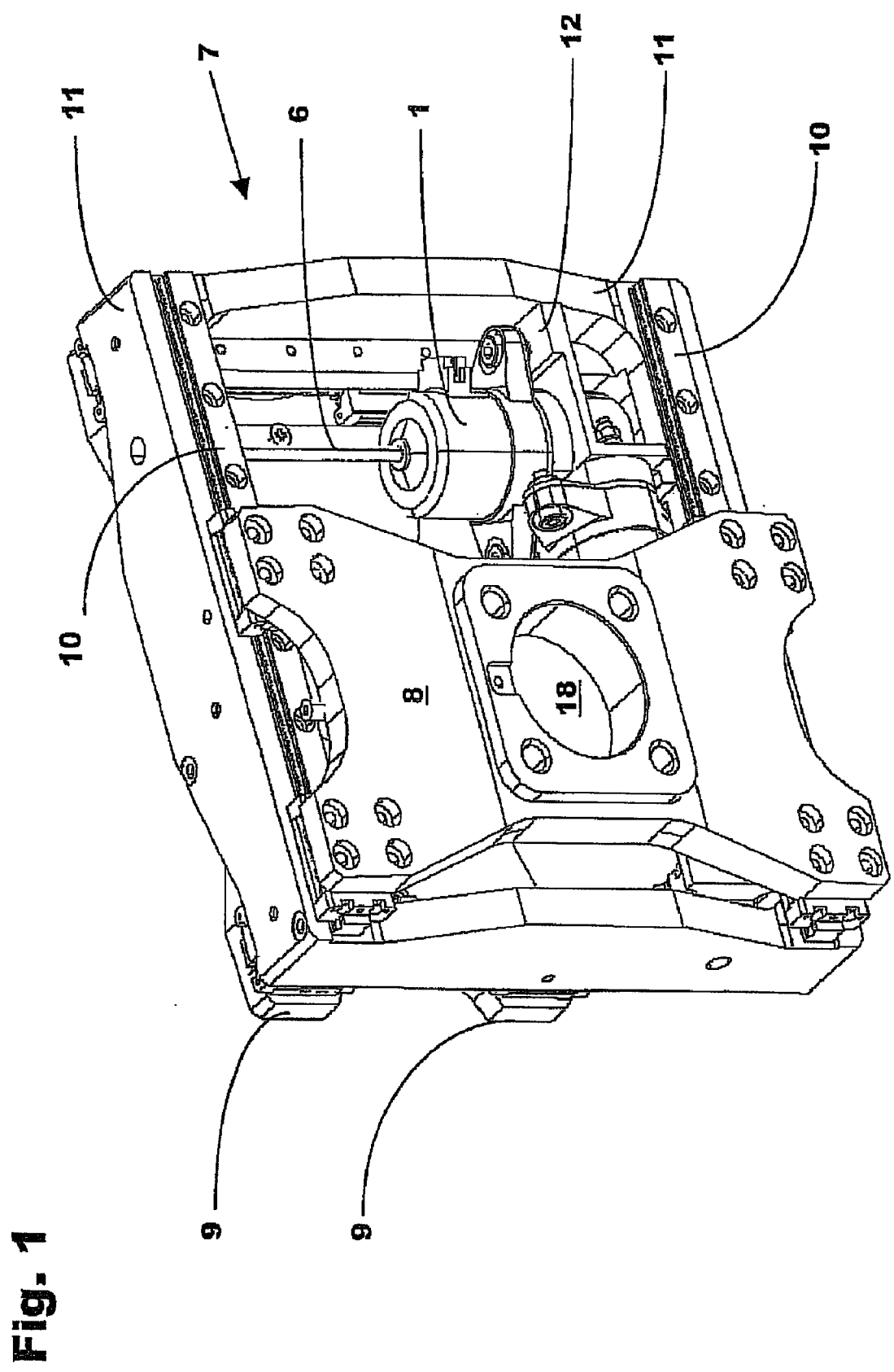
FIG. 1 is a view of an X-Y carriage having stepper motors.

FIG. 1 is a view of X-Y displacement unit 7 having a frame 11. Arranged on frame 11 is a linear guidance system 10 on which a carriage 8 movable in the X direction is mounted. A carriage 9 movable in the Y direction is arranged in equivalent fashion on the other side of frame 11. Associated with each of carriages 8, 9 is a receptacle 18 for a stand arm (not depicted) of a surgical microscope.

A stepper motor 1 having a drive shaft embodied as a threaded spindle 6 is provided to drive carriage 9. Stepper motor 1 is joined to a receiving flange 12. Receiving flange 12 is mounted on frame 11.

Figure 2:
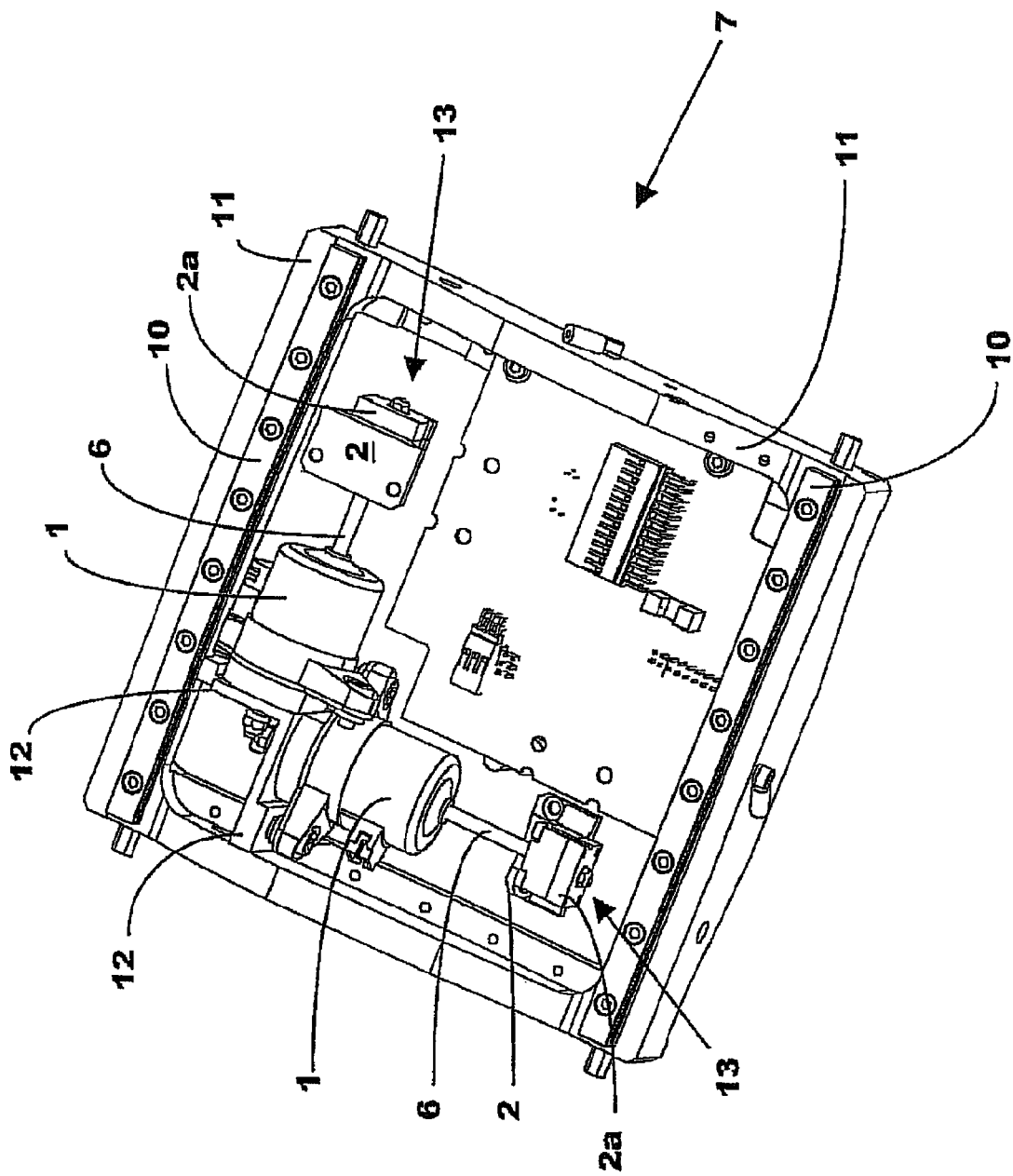
FIG. 2 shows the arrangement of the stepper motors in the carriage.

FIG. 2 is a view of X-Y displacement unit 7 with the stationary frame 11 and with stepper motors 1 for carriage 8 and carriage 9 (not visible in FIG. 2). Stepper motor 1 is joined to receiving flange 12.

For each direction, spindle 6 of stepper motor 1 is retained in a spindle guide 13 that is joined to a flange 2 as a drive for the associated carriage 8 or 9. A rotation of spindle 6 by stepper motor 1 is thus converted into a linear motion of the associated carriage.

Figure 3:
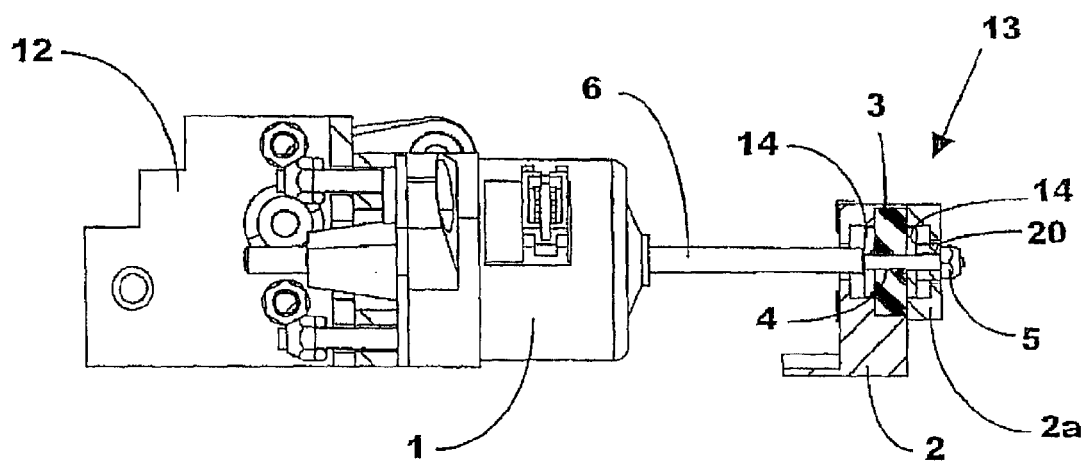
FIG. 3 is a sectioned depiction of the stepper motor with flange.

FIG. 3 is a section through spindle guide 13, with flange 2 in which an elastomeric damper 3 is retained via a flange 2a. Elastomeric damper 3 is arranged in clamped fashion between two washers 14 so as to result in a preload for elastomeric damper 3 of at least 6% of its volume. Spindle 6 of stepper motor 1 is guided through an orifice 4 in elastomeric damper 3 and through the two washers 14, and is equipped at the end with a nut 5 and a sleeve 20. The clamping of elastomeric damper 3 is accomplished via nut 5, sleeve 20, and the two washers 14. Elastomeric damper 3 may be made of a mixed cell polyurethane sold by Getzner Werkstoffe under the designation SYLODAMP HD 300.

Figure 4:
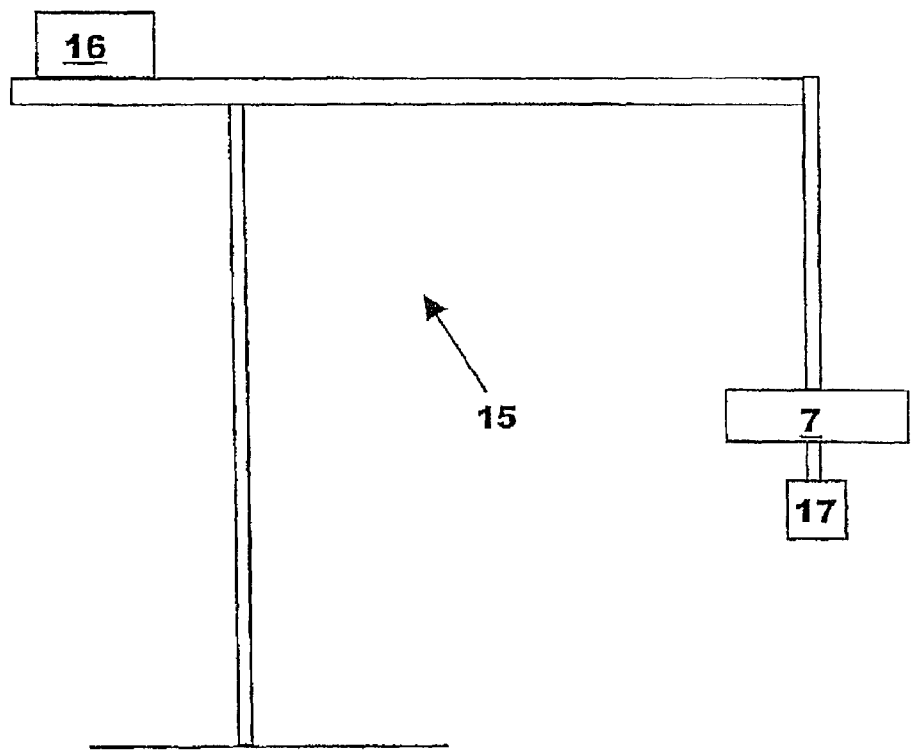
FIG. 4 shows a stand having a surgical microscope and X-Y displacement unit.

FIG. 4 schematically shows a stand 15 with a counterweight 16 and a surgical microscope 17 that is secured via X-Y displacement unit 7 on the stand. The image area of surgical microscope 17 can be modified by way of X-Y displacement unit 7.

Figure 5:
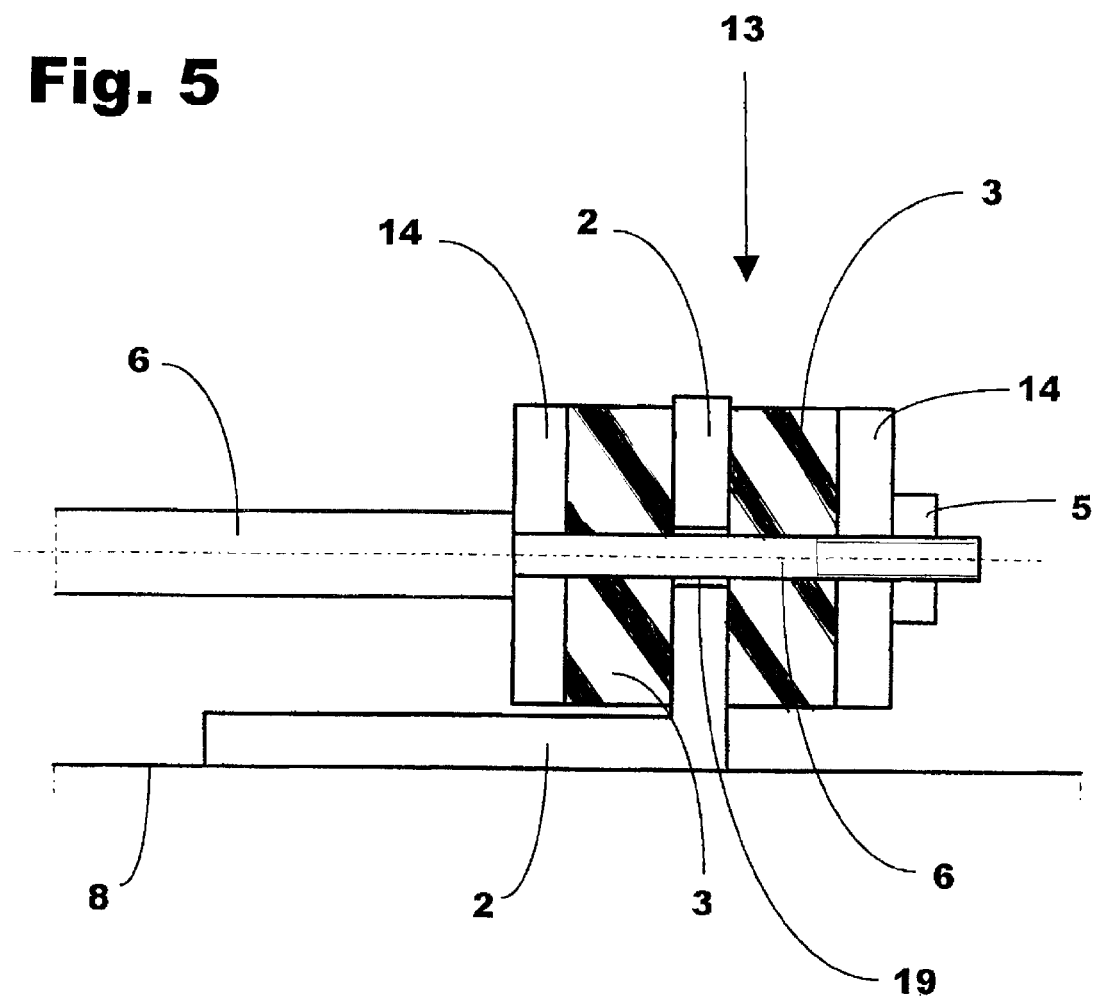
FIG. 5 is a sectioned depiction of the second exemplifying embodiment.

FIG. 5 shows a further exemplifying embodiment of spindle guide 13 having two elastomeric dampers 3 arranged parallel to one another, which are clamped between flange 2 and the two washers 14. For this, nut 5 is associated with spindle 6 so that a nonpositive connection between the two elastomeric dampers 3 and flange 2 is generated by tightening screw 5. The two elastomeric dampers are, in this context, compressed by at least 6% of the initial volume. Flange 2 has at the center an orifice 19 for the passage of spindle 6, and is joined directly to carriage 8.

PARTS LIST

1 Stepper motor
2 Flange
2a Flange
3 Elastomeric bearing
4 Orifice
5 Nut
6 Drive shaft; spindle
7 X-Y displacement unit
8 Carriage
9 Carriage
10 Linear guidance system
11 Frame
12 Receiving flange
13 Spindle guide
14 Washer
15 Stand
16 Counterweight
17 Surgical microscope
18 Receptacle
19 Orifice
20 Sleeve

What is claimed is:

1. An X-Y displacement unit for positioning a surgical microscope along orthogonal X and Y directions, the X-Y displacement unit comprising:
   a frame;
   a first stepper motor and a second stepper motor each mounted on the frame;
   a first threaded spindle extending in the X direction through a housing of the first stepper motor, the first threaded spindle being driven by the first stepper motor in the X direction;
   a second threaded spindle extending in the Y direction through a housing of the second stepper motor, the second threaded spindle being driven by the second stepper motor in the Y direction;
   a first carriage connected to the first threaded spindle for travel with the first threaded spindle in the X direction;
   a second carriage connected to the second threaded spindle for travel with the second threaded spindle in the Y direction;
   a first elastomeric damper arranged to receive the first threaded spindle, the first threaded spindle being connected to the first carriage via the first elastomeric damper such that no direct connection exists between the first threaded spindle and the first carriage; and
   a second elastomeric damper arranged to receive the second threaded spindle, the second threaded spindle being connected to the second carriage via the second elastomeric damper such that no direct connection exists between the second threaded spindle and the second carriage.

2. The X-Y displacement unit according to claim 1, wherein each of the first carriage and the second carriage includes a flange in which the first elastomeric damper and the second elastomeric damper are arranged.

3. The X-Y displacement unit according to claim 2, wherein there are a plurality of first elastomeric dampers and a plurality of second elastomeric dampers.

4. The X-Y displacement unit according to claim 3, wherein the plurality of first elastomeric dampers are arranged next to one another, and the plurality of second elastomeric dampers are arranged next to one another.

5. The X-Y displacement unit according to claim 3, wherein the plurality of first elastomeric dampers includes at least two first elastomeric dampers nonpositively joined to the flange by at least two washers, and the plurality of second elastomeric dampers includes at least two second elastomeric dampers nonpositively joined to the flange by at least two other washers.

6. The X-Y displacement unit according to claim 1, wherein the first elastomeric damper includes an orifice through which the first threaded spindle extends, and the second elastomeric damper includes another orifice through which the second threaded spindle extends.

7. The X-Y displacement unit according to claim 1, wherein the first elastomeric damper is embodied as a washer and the second elastomeric damper is embodied as another washer.

8. The X-Y displacement unit according to claim 1, wherein at least one of the first elastomeric damper and the second elastomeric damper is installed with a preload of at least 6% of its original volume.

9. The X-Y displacement unit according to claim 1, wherein the first and second threaded spindles are directly driven by the first and second stepper motors, respectively.

* * * * *